US008765085B2

(12) United States Patent
Tran et al.

(10) Patent No.: US 8,765,085 B2
(45) Date of Patent: Jul. 1, 2014

(54) BASE METAL CATALYST AND METHOD OF USING SAME

(71) Applicant: BASF Corporation, Florham Park, NJ (US)

(72) Inventors: Pascaline Harrison Tran, Holmdel, NJ (US); Xinsheng Liu, Edison, NJ (US); Ye Liu, Holmdel, NJ (US); Michael P. Galligan, Cranford, NJ (US); Qinglin Zhang, Manalapan, NJ (US)

(73) Assignee: Basf Corporation, Florham Park, NJ (US)

( * ) Notice: Subject to any disclaimer, the term of this patent is extended or adjusted under 35 U.S.C. 154(b) by 0 days.

(21) Appl. No.: 13/867,182

(22) Filed: Apr. 22, 2013

(65) Prior Publication Data

US 2013/0330258 A1 Dec. 12, 2013

Related U.S. Application Data

(60) Provisional application No. 61/638,665, filed on Apr. 26, 2012.

(51) Int. Cl.
B01D 53/94 (2006.01)
B01J 23/10 (2006.01)
B01J 23/70 (2006.01)
B01J 29/00 (2006.01)
F01N 3/28 (2006.01)

(52) U.S. Cl.
USPC .............. 423/213.2; 60/299; 60/301; 502/66; 502/303; 502/304; 502/305; 502/324; 502/325; 502/345

(58) Field of Classification Search
USPC ........... 502/66, 303, 304, 305, 324, 325, 345; 423/213.2; 60/299, 301
See application file for complete search history.

(56) References Cited

U.S. PATENT DOCUMENTS 5,057,483 A 10/1991 Wan
5,063,193 A 11/1991 Bedford et al.
(Continued)

FOREIGN PATENT DOCUMENTS

CN 1060793 5/1992
CN 1103010 5/1995
(Continued)

OTHER PUBLICATIONS

"Coprecipitated CuO—MnOx Catalysts for Low-Temperature CO—NO and CO—NO—O2 Reactions", Ivanka Spassova et al, Journal of Catalysis 185, (1999), pp. 43-57.
(Continued)

Primary Examiner — Timothy Vanoy
(74) Attorney, Agent, or Firm — Melanie L. Brown

(57) ABSTRACT

Aspects of the invention relate to a base metal catalyst composition effective to catalyze the abatement of hydrocarbons, carbon monoxide and nitrogen oxides under both rich and lean engine operating conditions comprising a support including at least 10% by weight of reducible ceria doped with up to about 60% by weight of one or more of oxides selected from the group Al, Pr, Sm, Zr, Y, Si, Ti and La; and a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx. Other aspects of the invention relate to methods of using and making such catalysts.

20 Claims, 18 Drawing Sheets

(56) References Cited

U.S. PATENT DOCUMENTS

| | | |
|---|---|---|
| 5,130,109 A | 7/1992 | Wan |
| 5,182,249 A | 1/1993 | Wang et al. |
| 5,206,196 A | 4/1993 | Nakano et al. |
| 5,208,198 A | 5/1993 | Nakano et al. |
| 5,382,416 A | 1/1995 | Nakano et al. |
| 5,759,947 A | 6/1998 | Zhou |
| 5,807,528 A | 9/1998 | Nakano et al. |
| 5,925,590 A | 7/1999 | White et al. |
| 5,939,354 A | 8/1999 | Golden et al. |
| 5,965,098 A | 10/1999 | Boegner et al. |
| 5,977,017 A | 11/1999 | Golden |
| 6,046,129 A | 4/2000 | Duan et al. |
| 6,326,329 B1 | 12/2001 | Nunan |
| 6,555,492 B2 | 4/2003 | Faber et al. |
| 6,696,389 B1 | 2/2004 | Boegner et al. |
| 7,527,776 B2* | 5/2009 | Golden et al. ............ 423/239.1 |
| 7,601,670 B2 | 10/2009 | Yasuda et al. |
| 7,767,175 B2* | 8/2010 | Golden et al. ............ 423/213.2 |
| 7,785,551 B2* | 8/2010 | Golden et al. ............ 423/239.1 |
| 7,985,391 B2* | 7/2011 | Collier et al. ............ 423/239.1 |
| 8,012,439 B2 | 9/2011 | Arnold et al. |
| 8,263,032 B2 | 9/2012 | Andersen et al. |
| 2002/0147103 A1 | 10/2002 | Ruettinger et al. |
| 2007/0179053 A1 | 8/2007 | Lee et al. |
| 2009/0325793 A1* | 12/2009 | Takeshima et al. ........... 502/304 |
| 2010/0239478 A1 | 9/2010 | Arnold et al. |
| 2010/0240525 A1 | 9/2010 | Golden et al. |
| 2010/0247409 A1* | 9/2010 | Collier et al. ............ 423/213.2 |
| 2010/0266473 A1* | 10/2010 | Chen et al. ................ 423/245.1 |
| 2010/0303712 A1* | 12/2010 | Nagaoka et al. ............ 423/651 |
| 2011/0263417 A1* | 10/2011 | Collier et al. ................ 502/304 |
| 2012/0141347 A1* | 6/2012 | Collier et al. ............ 423/239.1 |

FOREIGN PATENT DOCUMENTS

| | | |
|---|---|---|
| CN | 101773830 | 7/2010 |
| CN | 102240570 | 11/2011 |
| DE | 10339007 A1 | 4/2004 |
| DE | 1021101104 | 8/2011 |
| EP | 393517 | 10/1990 |
| JP | H03186346 | 8/1991 |
| JP | H0435744 | 2/1992 |
| JP | H0440045 | 4/1992 |
| JP | H04122447 | 4/1992 |
| JP | H0699067 | 4/1994 |
| JP | H07116474 | 5/1995 |
| JP | 2000042369 | 2/2000 |
| JP | 200342970 | 12/2000 |
| JP | 2007000795 | 11/2007 |
| JP | 2007283208 | 11/2007 |
| JP | 4547930 | 9/2010 |
| MD | 2607 | 11/2004 |
| WO | 95/03877 A1 | 2/1995 |
| WO | WO98/51401 | 5/1998 |
| WO | WO-02/26619 | 4/2002 |
| WO | WO2009/158009 | 12/2009 |

OTHER PUBLICATIONS

English Language Abstract of DE 10339007 Apr. 15, 2004.

* cited by examiner

BASE METAL CATALYST AND METHOD OF USING SAME

CROSS-REFERENCE TO RELATED APPLICATIONS

This application claims priority to U.S. Provisional Application No. 61/638,665, filed Apr. 26, 2012, the entire contents of which are hereby incorporated by reference.

TECHNICAL FIELD

Embodiments of the invention generally relate to a base metal catalyst for the abatement of hydrocarbons, carbon monoxide and nitrogen oxides in an exhaust stream. More particularly, the invention provides catalyst articles and methods for treatment of exhaust produced by internal combustion engines, including carbureted motorcycle engines.

BACKGROUND

Engine exhaust often contains incomplete combustion compounds such as hydrocarbons, carbon monoxide (CO) and nitrogen oxides (NOx). These compounds have to be removed from engine exhaust for air pollution control and to satisfy various government regulations. There are various systems that have been created for various types of engines and fuel configurations to address the challenging emission control problems. These include three way catalysts, close-coupled catalysts, as well as filters or catalyzed filters. Most of these catalysts or combined catalyst systems are based on precious metals, including Pt, Pd and Rh. Although these noble metal catalysts are effective for mobile emission control and have been commercialized in industry, precious metals are extremely expensive. This high cost remains a critical factor for wide spread applications of these catalysts. There is a constant need of alternative, cheaper catalysts for the effective removal of HC, CO and NOx compounds from mobile emission sources in order to meet increasingly stringent regulations.

One possible alternative has been the use of base metals. Base metals are abundant and much less costly than the precious metals. Several attempts have been made to develop base metal based catalysts for emission control. However, each of these attempts has been fraught with problems. For example, some monolith catalysts have been made that result in the formation of $AB_2O_4$ and perovskite type crystal $ABO_3$. However, formation of perovskite structure significantly reduces the catalyst surface area. In other attempts, Cr has been used. However, Cr is highly toxic. Base metal formulations containing both Zn and Cr are likely to lead to catalyst deactivation as a result of Zn loss and regulatory barrier, due to toxicity of Cr. Other base metal catalysts have simply not been able to achieve acceptable levels of pollutant reduction.

In a carbureted motorcycle engine, wide ranges of air to fuel ratios are often encountered as a result of loose control by the carburetor. An emission control catalyst is therefore required to function in this wide range of environments and often loses CO conversion activity under rich aging conditions. Carbureted motorcycle engine emission is characterized with oscillating gas compositions and flow rates (volume) during various driving cycles. Under so-called "rich conditions," the air-to-fuel ratio of the exhaust is less than the stoichiometric ratio required for complete oxidation of hydrocarbon and CO and reduction of NOx. Similarly, under what is known in the art as "lean conditions," there is excess air supplied, which provides more than enough oxygen for CO and hydrocarbon oxidation. However under lean conditions, there is insufficient reductant for NOx reduction.

Additionally, the temperature of engine emission may vary depending on the stage of the driving cycle, type of fuel, and engine technologies. Emission gas also contains steam as a combustion byproduct at a level of about 10%. Thus, to simultaneously convert HC, CO and NOx under both rich and lean conditions, water activation is critical. Under rich conditions, steam reforming of hydrocarbons and water gas shift reaction can make up the deficiency in oxidant ($O_2$). Similarly, the reforming and water gas shift reactions can produce more efficient reductant ($H_2$) than hydrocarbons and CO for NOx conversion under lean conditions.

Thus, there is a need for a TWC-containing catalyst article with improved CO conversion performance and stability after hydrothermal aging, particularly under rich engine operating conditions. There is also a need for an affordable, yet effective, catalyst. In particular, there is a need for such a catalyst for carbureted motorcycle engine applications.

SUMMARY

One aspect of the invention relates to a base metal catalyst composition effective to catalyze the abatement of hydrocarbons, carbon monoxide and nitrogen oxides under both rich and lean engine operating conditions. The catalyst composition comprises a support including at least 10% by weight of reducible ceria doped with up to about 60% by weight of one or more of oxides selected from the group Al, Pr, Sm, Zr, Y, Si, Ti and La; and a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx. In one embodiment, the kinetics of each reaction matches rich-lean cycles of engine operation dynamics. In a second embodiment, the catalyst provides thermodynamically limiting oxidants during rich operation and reductants during lean operation and reaction kinetics needed for near complete conversion of HC, CO and NOx.

The selected components and amounts of the components can be varied. For example, in one embodiment, the support includes at least 35% by weight of reducible ceria, and in a further embodiment, up to about 99% by weight of reducible ceria. In another embodiment, the reducible ceria is doped with up to about 90% by weight of one or more oxides of Al, Pr, Sm, Zr, Y and La. In another embodiment, the oxide of one or more of Al, Pr, Sm, Zr, Y, Si, Ti and La is present in an amount ranging from about 1 to about 50 wt %. In yet another embodiment, the catalyst support comprises oxides of Zr, and Pr, oxides of Al, or oxides of Zr, La and Y. In another embodiment, the support further comprises a zeolite having a chabazite crystal structure.

The selected base metals and relative amounts can also be varied. Thus, in one embodiment, the base metal is selected from one or more of Ni, Mn, Co, Mo, Ga, Fe, Cu, Mg and Ba. In a further embodiment, the base metal is selected from one or more of Ni, Mn, Co, Fe, and Cu. In another embodiment, the base metal oxide is present in an amount ranging from about 1 to about 30 wt %, about 2 to about 30 wt %, about 5 to about 25 wt %, or about 10 to about 20 wt %. In one or more embodiments, the catalyst comprises more than one base metal. For example, the catalyst may comprise two or three base metals.

A second aspect of the invention relates to a method of treating a gas stream generated by a motorcycle using a catalyst described above. Thus, the method comprises contacting a gas stream containing hydrocarbons, carbon monoxide and nitrogen oxides and generated by a motorcycle under both rich and lean engine operating conditions with a base metal catalyst composition comprising a support including at least 10% by weight of reducible ceria doped with up to about 60% by weight of one or more of oxides selected from the group Al, Pr, Sm, Zr, Y, Si, Ti and La; and a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx, thereby removing at least a part of the hydrocarbons, carbon monoxide and nitrogen oxides in gas stream. In one embodiment, the catalyst provides thermodynamically limiting oxidants during rich operation and reductants during lean operation and reaction kinetics needed for near complete conversion of HC, CO and NOx.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
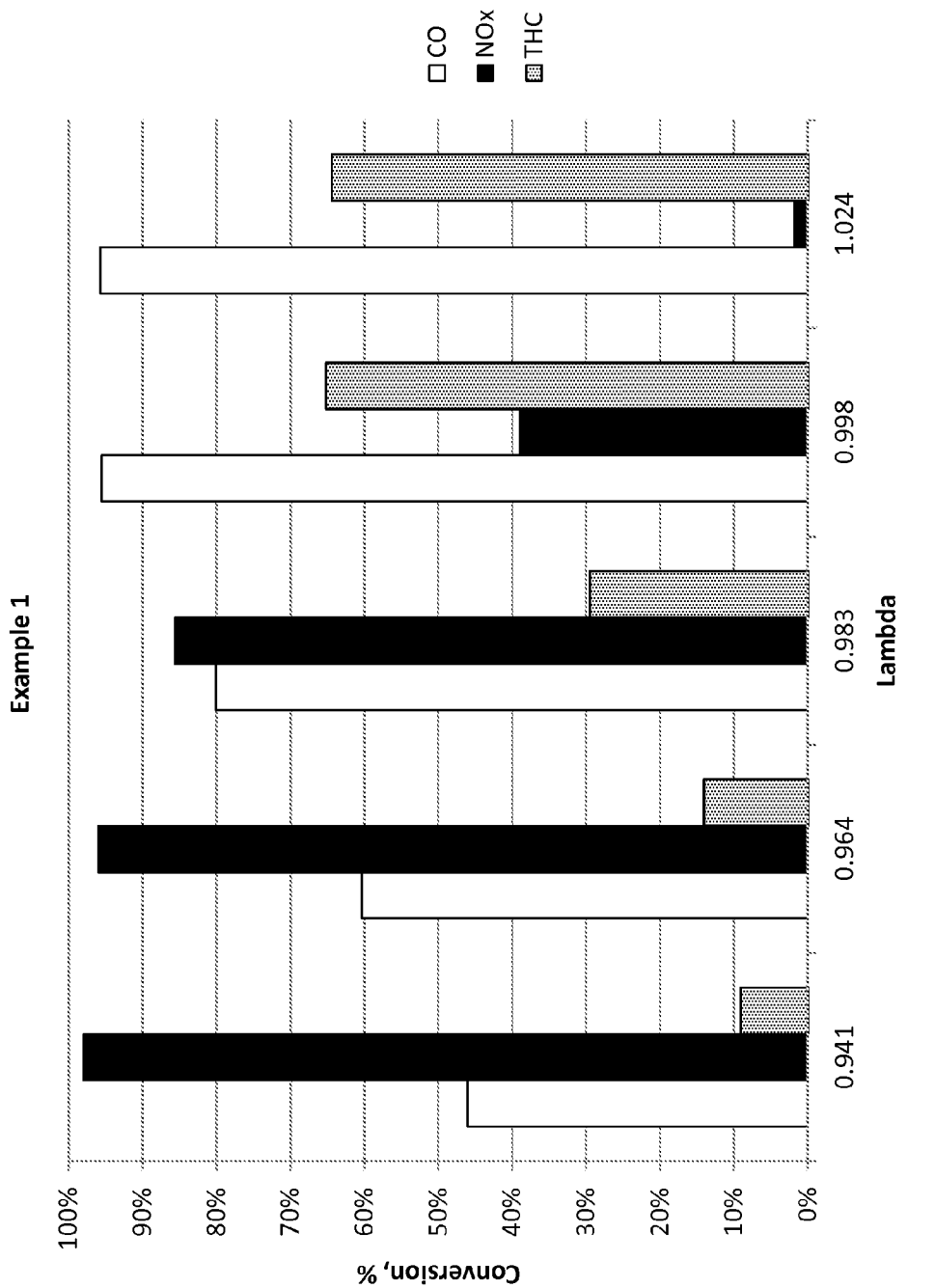
FIG. 1 shows the performance of the catalyst from Example 1 under a simulated rich-lean cycle test at 450° C.

Before describing several exemplary embodiments of the invention, it is to be understood that the invention is not limited to the details of construction or process steps set forth in the following description. The invention is capable of other embodiments and of being practiced or being carried out in various ways.

Provided herein are base metal catalyst formulations and processes for making and using the same. According to various embodiments of the invention, the base metal catalyst are suitable for use as three way catalysts for simultaneous removal of hydrocarbons (HC), CO and NOx under typical engine operating cycles.

Thus, one aspect of the invention relates to a base metal catalyst composition effective to catalyze the abatement of hydrocarbons, carbon monoxide and nitrogen oxides under both rich and lean engine operating conditions. The base metal catalyst comprises a support including at least 10% by weight of reducible ceria doped with up to about 60% by weight of one or more of oxides selected from the group Al, Pr, Sm, Zr, Y, Si, Ti and La; and a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx.

Although not wishing to be bound to any particular theory, it is thought that the base metal catalyst according to one or more embodiments of the invention catalyzes various reactions related to hydrocarbon, CO and NOx abatement so that the kinetics of each reaction matches the dynamics of rich-lean cycles of engine operation.

Carbureted motorcycle engine emission is characterized with oscillating gas compositions and flow rates (volume) during various driving cycles. Under so-called "rich conditions," the air-to-fuel ratio of the exhaust is less than the stoichiometric ratio required for complete oxidation of hydrocarbon and CO and reduction of NOx. Similarly, under what is known in the art as "lean conditions," there is excess air supplied, which provides more than enough oxygen for CO and hydrocarbon oxidation. However under lean conditions, there is insufficient reductant for NOx reduction.

Additionally, the temperature of engine emission may vary depending on the stage of the driving cycle, type of fuel, and engine technologies. Emission gas also contains steam as a combustion byproduct at a level of about 10%. Thus, to simultaneously convert HC, CO and NOx under both rich and lean conditions, water activation is critical. Under rich conditions, steam reforming of hydrocarbons and water gas shift reaction can make up the deficiency in oxidant ($O_2$). Similarly, the reforming and water gas shift reactions can produce more efficient reductant ($H_2$) than hydrocarbons and CO for NOx conversion under lean conditions. These catalyzed reactions are listed below:

CO: Water Gas Shift/Oxidation:

$$CO+H_2O \rightarrow CO_2+H_2$$

$$CO+O_2 \rightarrow CO_2$$

Hydrocarbons: Reforming/Oxidation:

$$HC+O_2 \rightarrow CO_2+H_2O$$

$$HC+H_2O \rightarrow CO_2+H_2+CO$$

NOx: Selective Catalytic Reduction (HC, CO and $H_2$ as Reductants):

$$NOx + CO/HC \rightarrow N_2 + CO_2$$

$$NOx + H_2 \rightarrow N_2 + H_2O$$

Other Reactions:

$$H_2 + O_2 \rightarrow H_2O$$

Oxygen Storage Component (OSC) Redox Reactions, $$i.e., Ce_2O_3 + O_2 \rightarrow CeO_2$$

Thus, through water activation, one or more embodiments of the invention provide thermodynamically limiting oxidants/reductants and the kinetics needed for the near complete conversion of HC, CO and NOx under both rich and lean operating cycles. These formulations contain mixed base metal oxides either in solid mixed phases or in supported mixed phases. Accordingly, in one or more embodiments of the invention, the kinetics of each reaction matches rich-lean cycles of engine operation dynamics. In another embodiment, the catalyst provides thermodynamically limiting oxidants during rich operation and reductants during lean operation and reaction kinetics needed for near complete conversion of HC, CO and NOx.

In one or more embodiments, the catalyst supports contains oxygen storage components (OSC), whose valent state can be switched under emission conditions. In one embodiment, the OSC is ceria. In further embodiments, the support includes at least 35% by weight of reducible ceria. In yet other embodiments, the support includes up to about 99% by weight of reducible ceria.

In certain embodiments, the OSC further contains other elements/components to improve the reducibility of the OSC component and to stabilize the OSC component against loss of surface area and structure integrity under high temperature hydrothermal aging condition. Such components can include Al, Pr, Sm, Zr, Y, Si, Ti and La, which may be present in an amount of up to about 60 wt %. Thus, in further embodiments, the reducible ceria is doped with up to about 90% by weight of one or more oxides of Al, Pr, Sm, Zr, Y and La. In further embodiments, the reducible ceria is doped with one or more oxides of these elements in amount less than or equal to about 60 wt %, or from about 1 to about 50 wt %. In a specific embodiment, the support comprises oxides of aluminum.

In one or more embodiments of the invention, more than one of these components can be used to dope the reducible ceria. Non-limiting examples of suitable combinations include oxides of: zirconium and praseodymium; zirconium, lanthanum and yttrium; and zirconium, praseodymium and aluminum. Note that the above weight percentages of dopants are for the total amount. Thus, for a catalyst support comprising 50 wt % oxide and two dopants, for example, then the oxides of both dopants combined would total 50 wt %.

In other embodiments, the support can further comprise other components. For example, in one embodiment, the support can further comprise a zeolite, and in more specific embodiments, one having a chabazite crystal structure. Embodiments relating to supports containing a zeolite can also contain other dopants of the variety described above. Thus, in one exemplary embodiment, the support comprises ceria, zirconia, lanthana, yttria and a zeolite with chabazite crystal structure.

As discussed above, the base metal is metal selected from one or more of Ni, Fe, Mn, Cu, Co, Ba, Mg, Ga, Ca, Sr, V, W, Bi and Mo and is effective to promote a steam reforming reaction of hydrocarbons and a water gas shift reaction to provide $H_2$ as a reductant to abate NOx. In a further embodiment, the base metal is selected from one or more of Ni, Mn, Co, Mo, Ga, Fe, Cu, Mg and Ba. In an even more specific embodiment, the base metal is selected from one or more of Ni, Mn, Co, Fe, and Cu. In other embodiments, the base metal oxide is present in an amount ranging from about 1 to about 30 wt %, or about 2 to about 30 wt %, or about 5 to about 25 wt %, or about 10 to about 20 wt %.

In some embodiments, more than one base metal can be used. Thus, in certain embodiments, the catalyst comprises two, three or even more base metals. Non-limiting examples of base metal combinations include, but are not limited to: copper and manganese; cobalt, iron, manganese, copper, iron and manganese, cobalt, nickel and iron, cobalt, nickel and manganese, nickel, iron, and manganese; copper, cobalt and iron; iron and manganese; and nickel, iron, and manganese. Note that the above weight percentages of base metal oxide are for the total base metal amount. Thus, for a catalyst comprising 15 wt % base metal oxide and two base metals, for example, then the two base metal oxides combined would total 15 wt %.

Preparation

Another aspect of the invention relates to methods of preparing the catalysts described herein. In one or more embodiments, the OSC and the promoters can be prepared into solid phase mixtures through wet chemistry process such as co-precipitation, aging, drying and calcination or a dry process of chemical vapor deposition (CVD), aerosol spray dry/calcination, plasma or other processes. These elements can also be added together with active base metal components during catalyst preparation without use of the pre-formed oxides as supports.

In one or more embodiments, the mode of use of the base metal catalysts are as monolith carrier supported catalysts. There are many suitable variants for the manufacture of the catalysts described herein. The active base metal catalyst formulations can be coated on the surface of monolith structure for mobile emission applications. Monolith structures offer high geometric surface area, excellent thermal and mechanical strength, and are thus particularly suitable for mobile emission control. Any monolith structure can be used that include ceramic, metallic such as Fecralloy®, stainless steel and other metals or alloys. The monolith can be of straight channel or pattern channels, or in foam or other structures.

The active catalyst can be applied to the monolith surface using any suitable process, including slurry coating, spray coating, etc. The active base metals are selected from Ni, Fe, Mn, Cu, Co, Ba, Mg, Ga, Ca, Sr, V, W, Bi and Mo. In specific embodiments, the base metal is selected from one or more of Ni, Mn, Co, Mo, Ga, Fe, Cu, Mg and Ba. The suitable precursors of these base metals may be of pure or mixed salts, oxides, or mixed oxides. These base metals can be applied using those chemical precusors and coating technologies well-known to a person having ordinary skill in the art. For example, cobalt can be applied using $Co(NO_3)_2 \cdot 6H_2O$, iron can be applied using $Fe(NO_3)_2 \cdot 9H_2O$, and manganese can be applied using $Mn(NO_3)_2 \cdot 4H_2O$ through a wet impregnation and slurry coating process.

In embodiments relating to supported base metal formulations, pre-made supports may be used for impregnation of the solution of active base metal or combination of base metals. Examples of such pre-made supports include, but are not limited to, ceria-alumina. The resulting catalyst can then be mixed with a suitable binder. Alternatively, the resulting catalyst can be calcined first, and then mixed with binder to make a suitable slurry for monolith coating. In yet other embodiments, the one or more active base metals deposited in one support may be mixed with other based metal catalysts deposited in another support to make a slurry for monolith washcoating.

The final coated monolith catalysts can then be dried at 120° C. for 2 hours and calcined at a temperature ranging from about 300 to about 1000° C. In other embodiments, the catalyst is calcined at a temperature ranging from about 400 to about 950° C. In a further embodiment, the catalyst is calcined at a temperature ranging from about 450 to about 500° C.

If a pre-made support is not used used in catalyst preparation, the desired base metals may be mixed with OSC and OSC promoters to form a homogeneous solution. Then, the solution pH can be adjusted through addition of, for example, $NH_4OH$, ammine, or other structure directing agents (such as polymer or surfactants), for co-precipitation. The mother solution can then be aged to obtain the suitable particle size for monolith coating. The precipitates may also be separated by using filtering for drying and calcination. The calcined based metal solid phase mixture is then used for making a slurry and monolith coating.

Method of Use

One or more embodiments of the catalysts described herein are suitable for treating the exhaust stream of motorcycles. Accordingly, another aspect of the invention relates to a method of treating a gas stream generated by a motorcycle. The method comprises contacting a gas stream containing hydrocarbons, carbon monoxide and nitrogen oxides and generated by a motorcycle under both rich and lean engine operating conditions with a base metal catalyst composition comprising a support including at least 10% by weight of reducible ceria doped with up to about 60% by weight of one or more of oxides selected from the group Al, Pr, Sm, Zr, Y, Si, Ti and La; and a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx, thereby removing at least a part of the hydrocarbons, carbon monoxide and nitrogen oxides in gas stream. Generally, variants of the catalyst used in this aspect may be chosen from the catalyst embodiments described above.

However, in specific embodiments, the catalyst provides thermodynamically limiting oxidants during rich operation and reductants during lean operation and reaction kinetics needed for near complete conversion of HC, CO and NOx. In other embodiments, the base metal oxide is present in an amount ranging from about 1 to about 30 wt %. In further embodiments, the base metal oxide is present in an amount ranging from about 2 to about 25 wt %. In yet other embodiments still, the support includes at least 35% by weight of reducible ceria.

EXAMPLES

There are many variations and combinations that can be made based on this disclosure to make base metal catalysts for mobile emission control without departure from the spirit of this disclosure. The following examples and embodiments are given as illustration purposes only that should not be used as limit to the invention.

Example 1

17.546 g of $Co(NO_3)_2.6H_2O$, 25.299 g of $Fe(NO_3)_2.9H_2O$ and 14.436 g of $Mn(NO_3)_2.4H_2O$ were mixed with 20 g deionized water to make a solution. 35 g of a pre-made support containing 55% ceria, 15% zirconia and 30% praseodymia was used for impregnation. The solution was added drop-wise on to the support until saturation. The impregnated support was then dried at 120° C. for 2 hours prior to adding the remaining solution. The impregnation-dry-impregnation cycle was repeated until no solution remained. Water was then added to the impregnated sample to make a slurry of 40% solid content. Milling of the slurry was continued until the desired particle size reaches $D_{90}<10$ micron.

A Fecralloy® monolith of 1" OD by 1" height with a cell density of 300 cpsi was used. Prior to washcoating of the catalysts slurry, the monolith was coated with a thin layer of alumina to ensure good adhesion of the catalysts formulation. The catalysts coating was applied using a dip coating process with a washcoat loading of 2 $g/in^3$. The coated monolith was then dried at 120° C. for 2 hours and calcined at 500° C. for 2 hours in air. The resulting catalyst composition is shown in Table 1 below.

Figure 2:
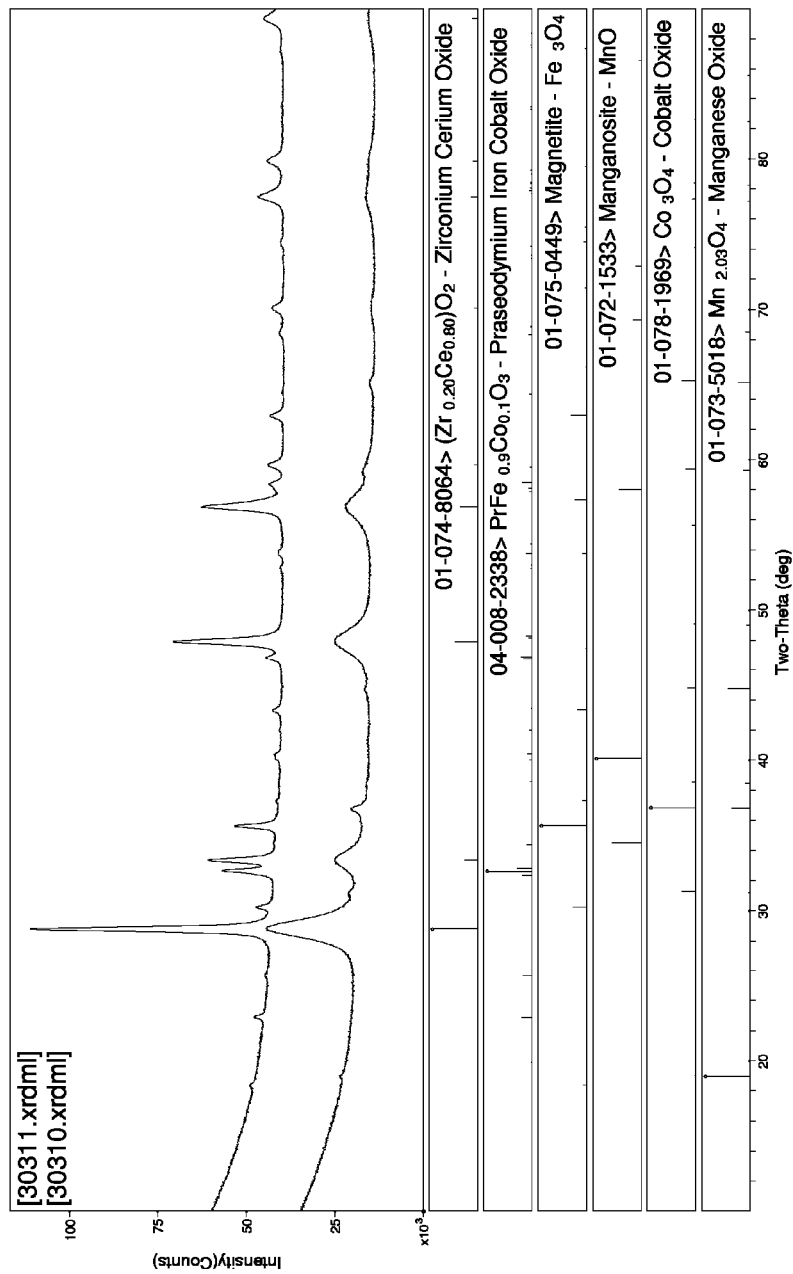
FIG. 2 is an XRD pattern showing the phase structures of the catalyst from Example 1 calcined at 500° C. and 950° C.
Figure 3:
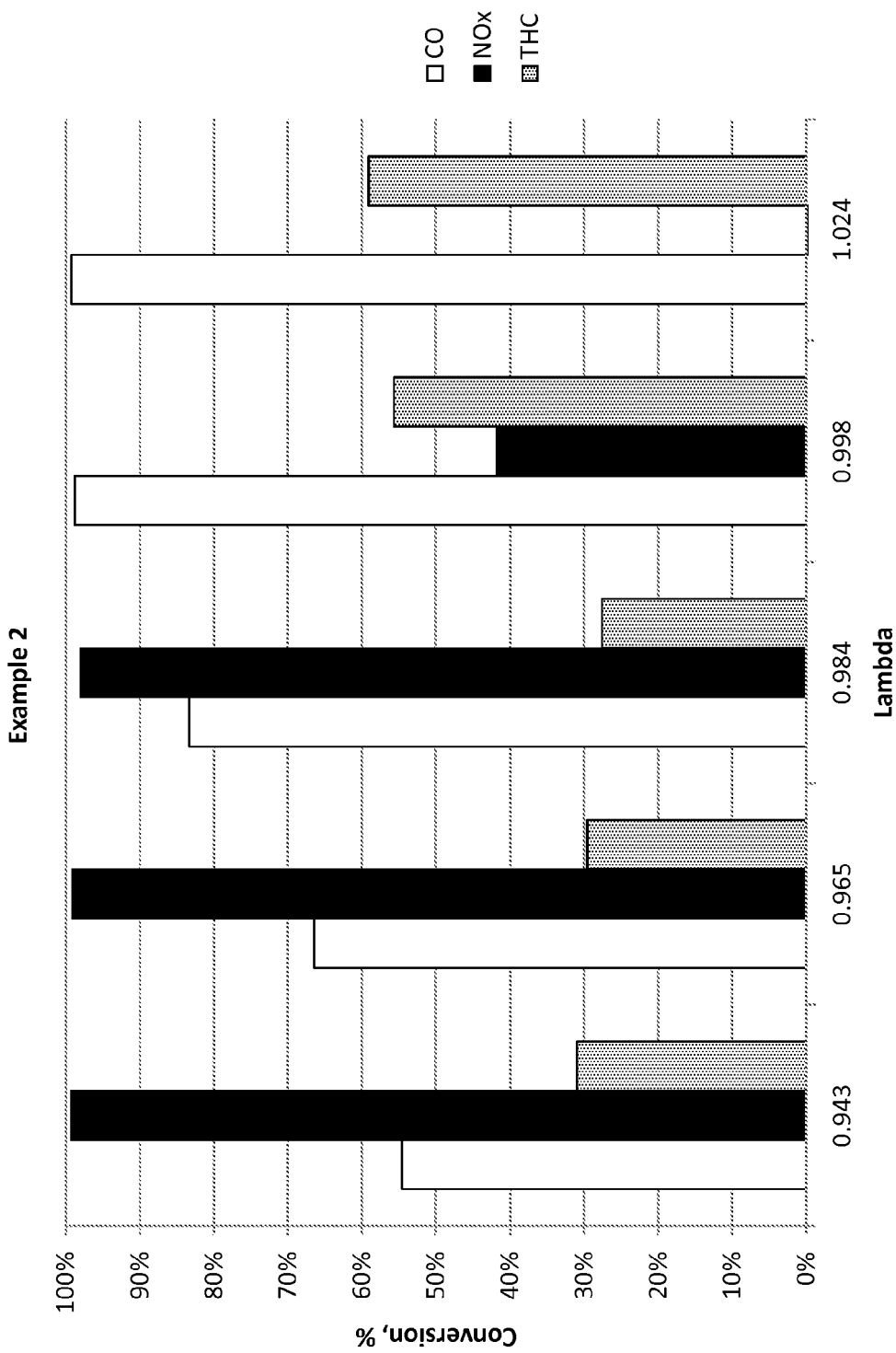
FIG. 3 shows the performance of the catalyst from Example 2 under a simulated rich-lean cycle test at 450° C.

FIG. 2 is the XRD pattern of the catalyst from Example 1, showing the phase structures. The bottom spectrum shows the catalyst calcined at 500° C., and the top spectrum shows the catalyst calcined at 950° C. As can be seen from the figure, this example incorporates mixed oxides of zicornium cerium oxide, praseodymium iron cobalt oxide, magnetite, manganosite, cobalt oxide and manganese oxide. The combination of metal oxides as disclosed in this example was shown to be an active three-way catalyst. These metal oxides or their combination may be prepared in different process as known to those skilled in the art following this disclosure.

Examples 2-6

These examples were made using the same pre-made support as that in Example 1 and following exactly the same procedures as those given in Example 1 except with different formulations. A summary of the formulations of Examples 2-6 can be seen in Table 1 below.

Figure 4:
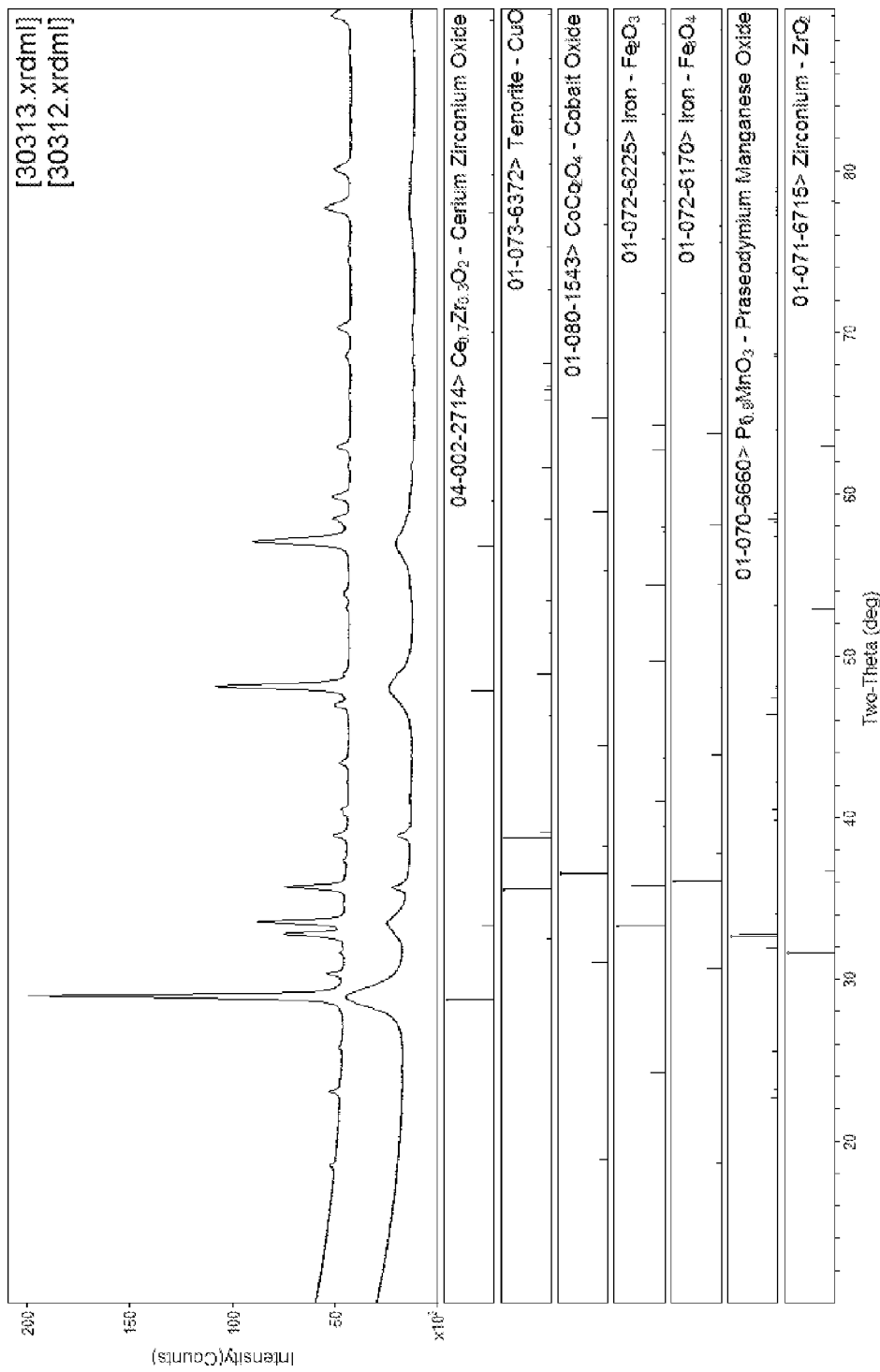
FIG. 4 is an XRD pattern showing the phase structures of the catalyst from Example 2 calcined at 500° C. and 950° C.
Figure 5:
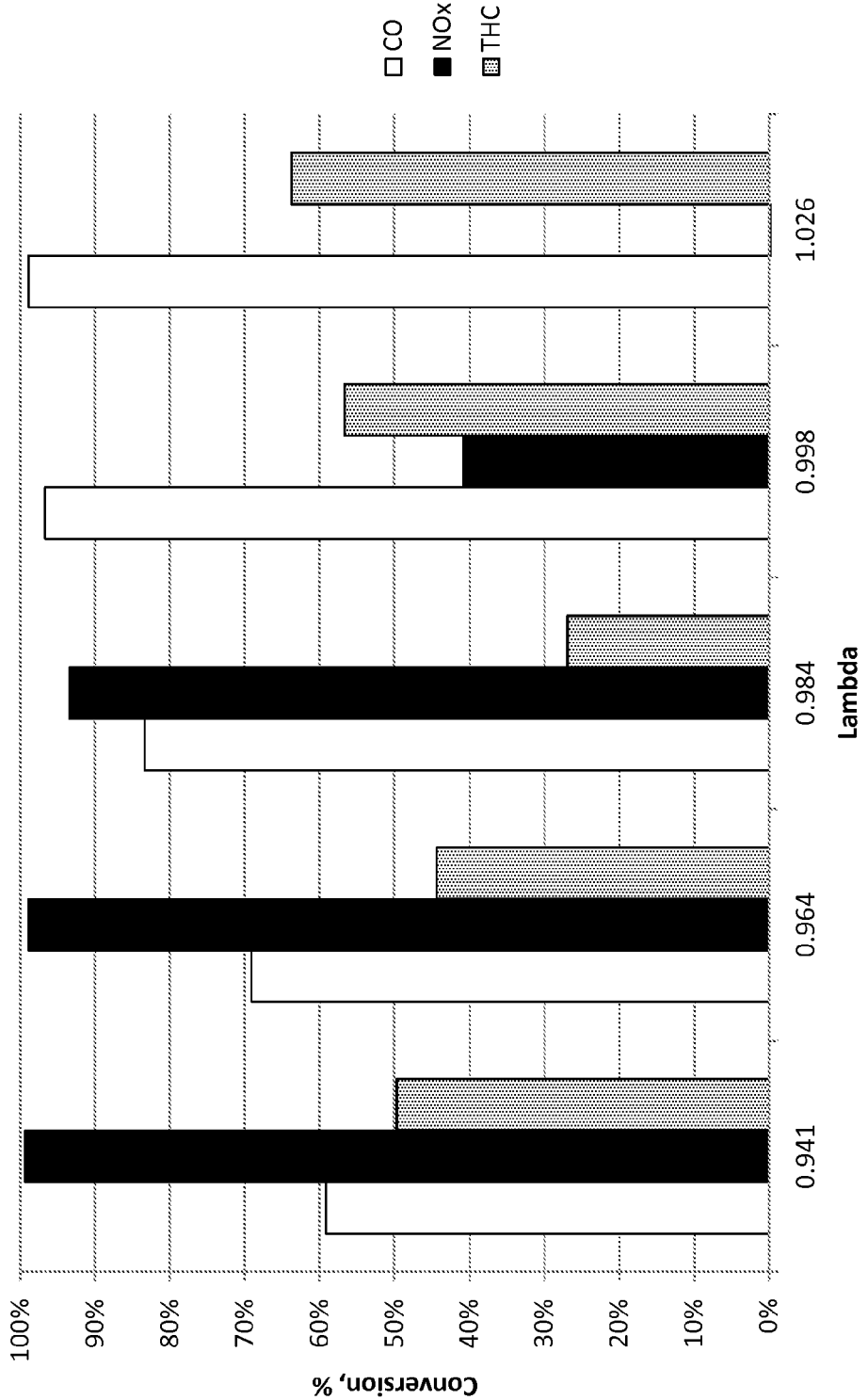
FIG. 5 shows the performance of the catalyst from Example 3 under a simulated rich-lean cycle test at 450° C.)

FIG. 4 is the XRD pattern of the catalyst from Example 2, showing the phase structures. The bottom spectrum shows the catalyst calcined at 500° C., and the top spectrum shows the catalyst calcined at 950° C. As can be seen from the figure, this example catalyst incorporates mixed oxides of zicornium cerium oxide, praseodymium manganese oxide, CuO, $Fe_2O_3$, $Fe_3O_4$, and $ZrO_2$.

Figure 6:
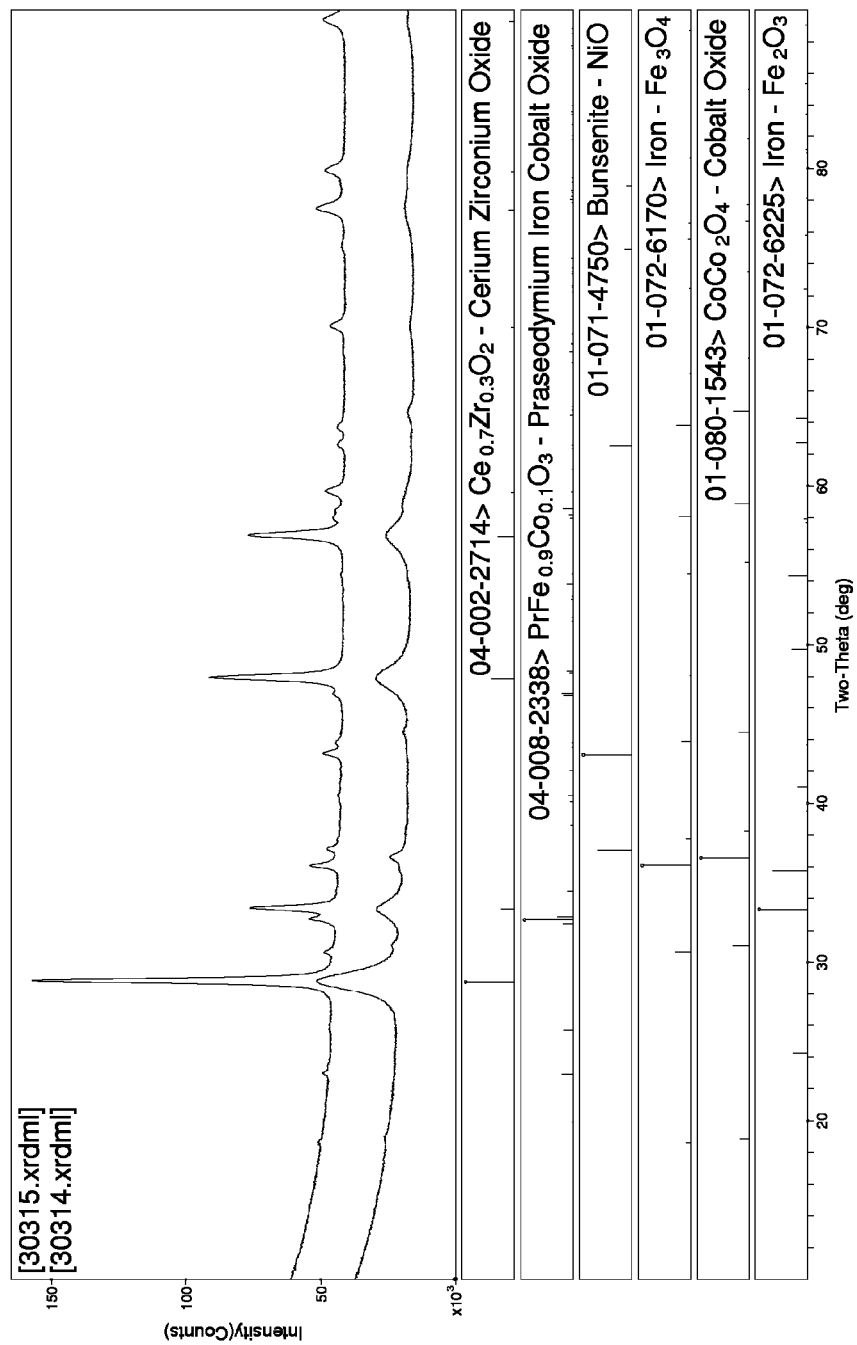
FIG. 6 is an XRD pattern showing the phase structures of the catalyst from Example 3 calcined at 500° C. and 950° C.
Figure 7:
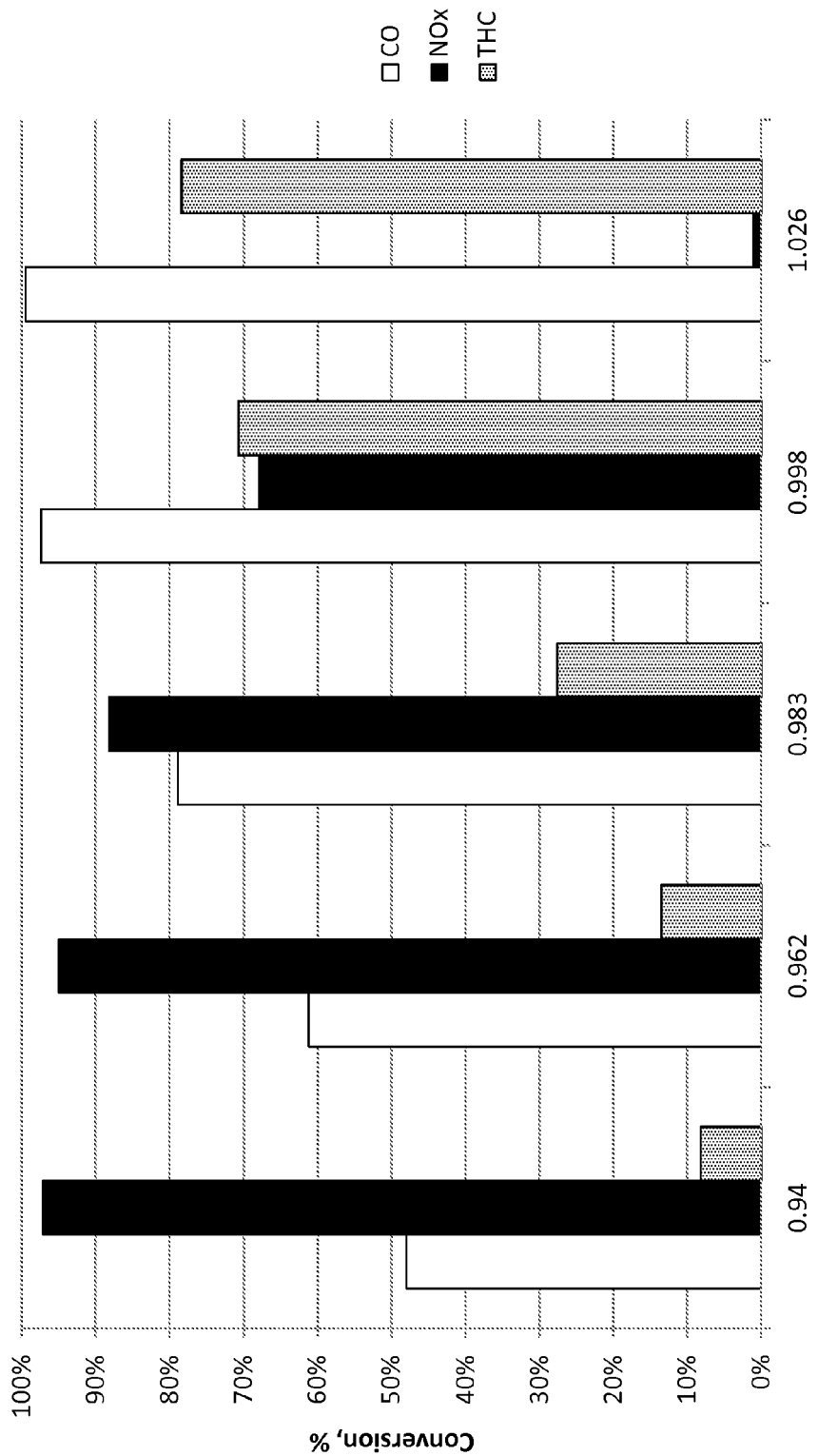
FIG. 7 shows the performance of the catalyst from Example 4 under a simulated rich-lean cycle test at 450° C.
Figure 8:
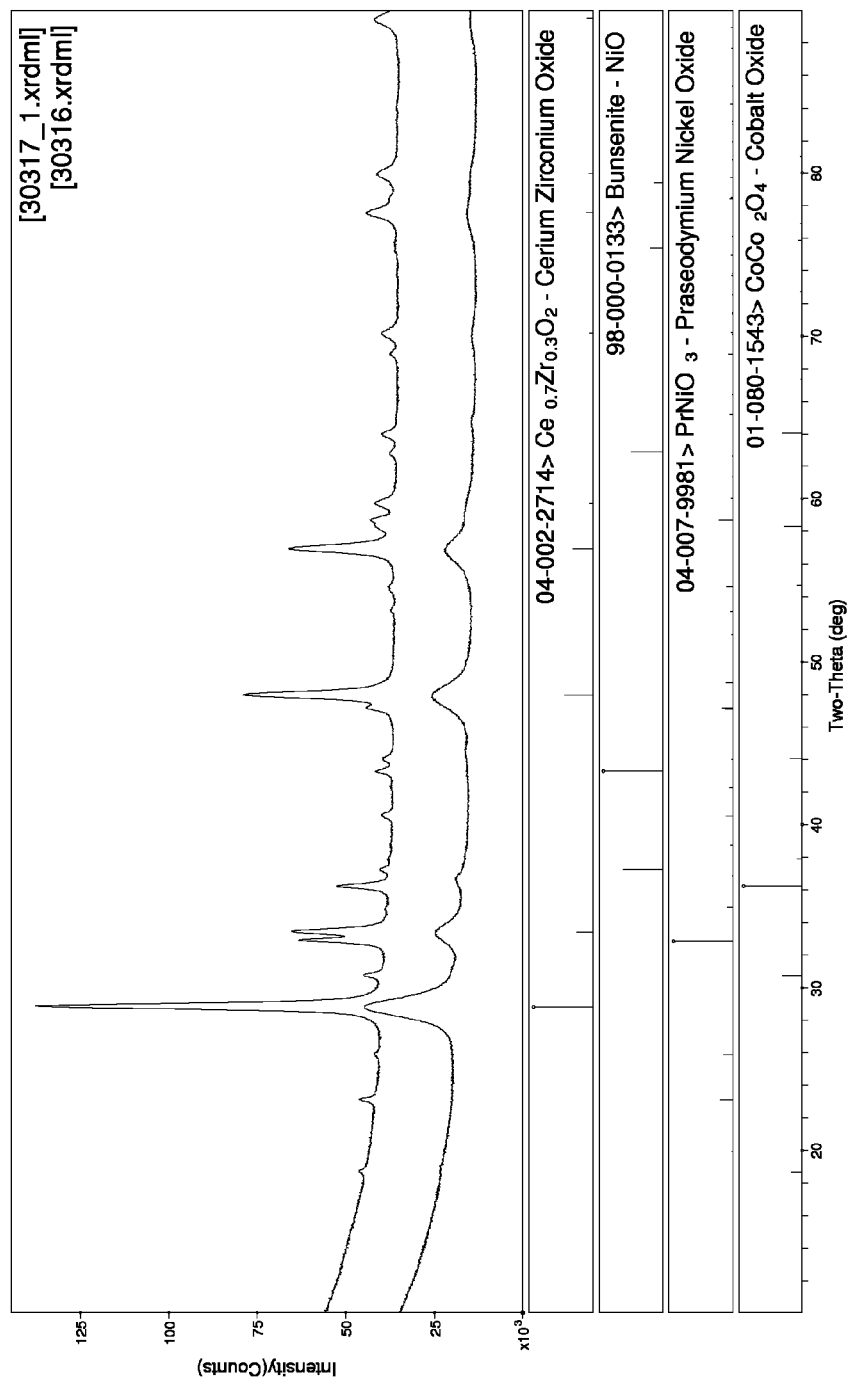
FIG. 8 is an XRD pattern showing the phase structures of the catalyst from Example 4 calcined at 500° C. and 950° C.
Figure 9:
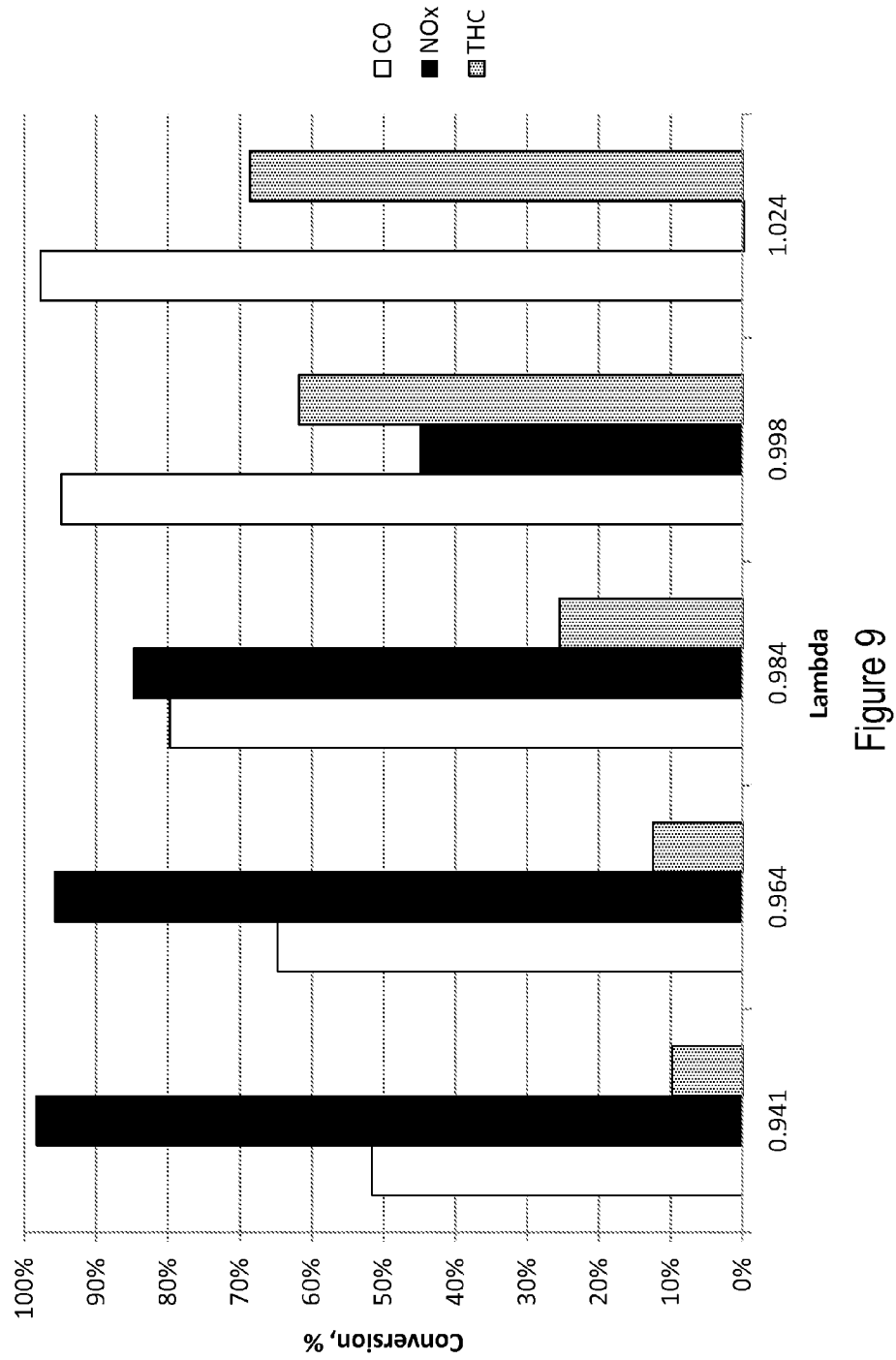
FIG. 9 shows the performance of the catalyst from Example 5 under a simulated rich-lean cycle test at 450° C.

FIG. 6 is the XRD pattern of the catalyst from Example 3, showing the phase structures. The bottom spectrum shows the catalyst calcined at 500° C., and the top spectrum shows the catalyst calcined at 950° C. As can be seen from the figure, this example catalyst incorporates mixed oxides of zicornium cerium oxide, praseodymium iron cobalt oxide, NiO, $Fe_2O_3$, $Fe_3O_4$, and $CO_3O_4$ FIG. 8 is the XRD pattern of the catalyst from Example 4, showing the phase structures. The bottom spectrum shows the catalyst calcined at 500° C., and the top spectrum shows the catalyst calcined at 950° C. As can be seen from the figure, this example catalyst incorporates mixed oxides of zicornium cerium oxide, praseodymium nickel oxide, NiO, and $Co_3O_4$.

Figure 10:
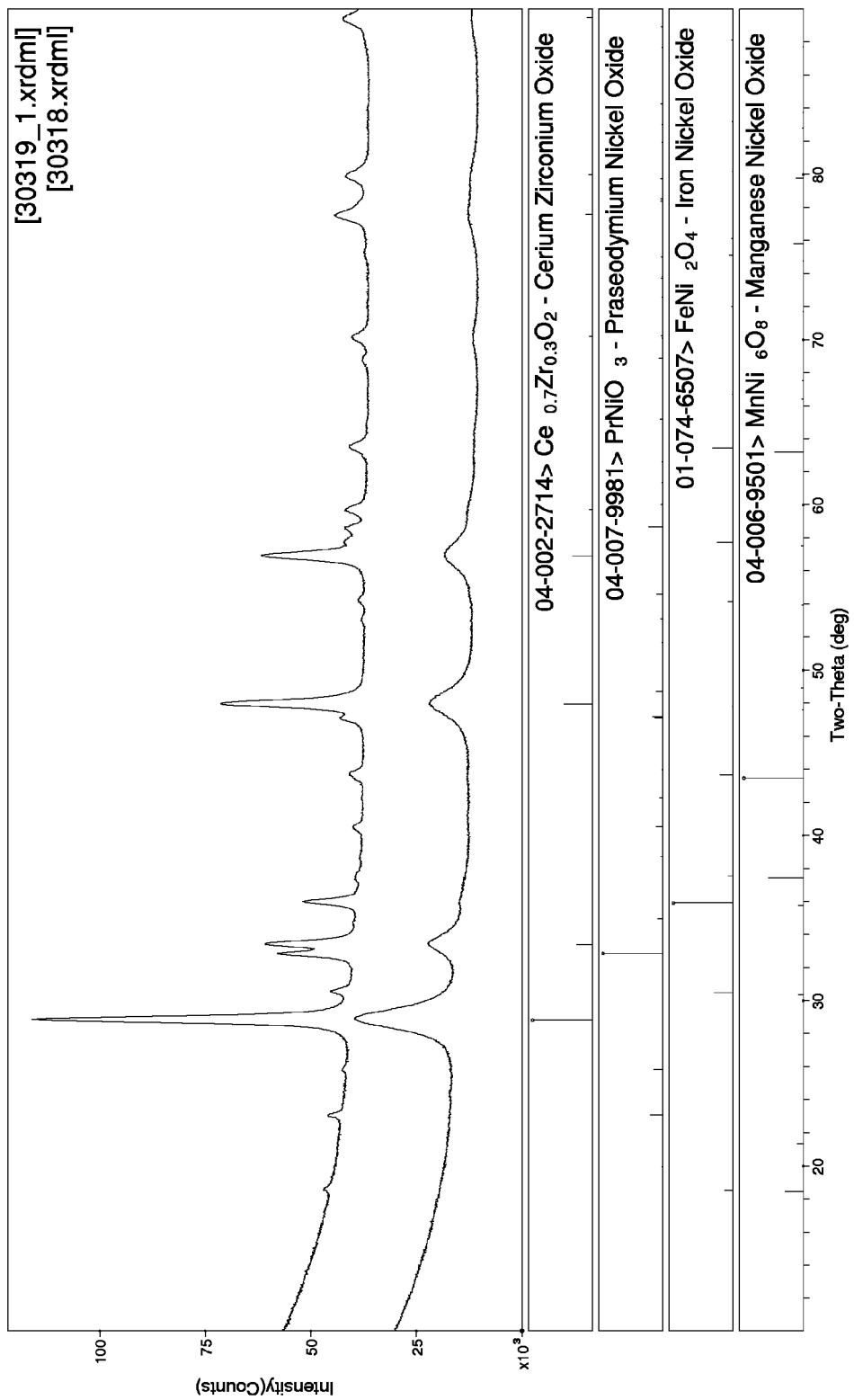
FIG. 10 is an XRD pattern showing the phase structures of the catalyst from Example 5 calcined at 500° C. and 950° C.
Figure 11:
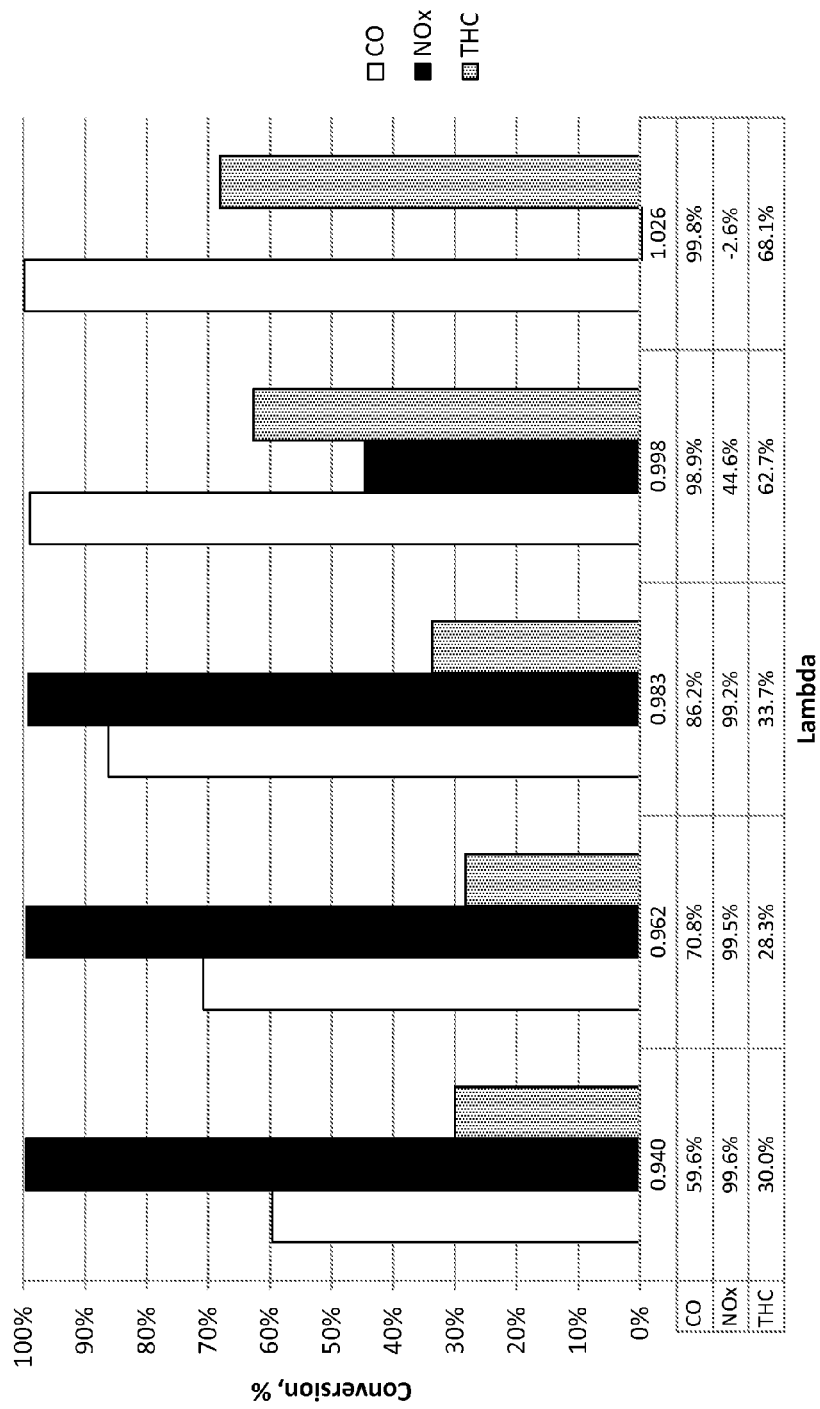
FIG. 11 shows the performance of the catalyst from Example 6 under a simulated rich-lean cycle test at 450° C.

FIG. 10 is the XRD pattern of the catalyst from Example 5, showing the phase structures. The bottom spectrum shows the catalyst calcined at 500° C., and the top spectrum shows the catalyst calcined at 950° C. As can be seen from the figure, this example catalyst incorporates mixed oxides of zicornium cerium oxide ($Ce_{0.7}Zr_{0.3}O_2$), praseodymium nickel oxide ($PrNiO_3$), $FeNi_2O_4$, and $MnNi_6O_8$.

Figure 12:
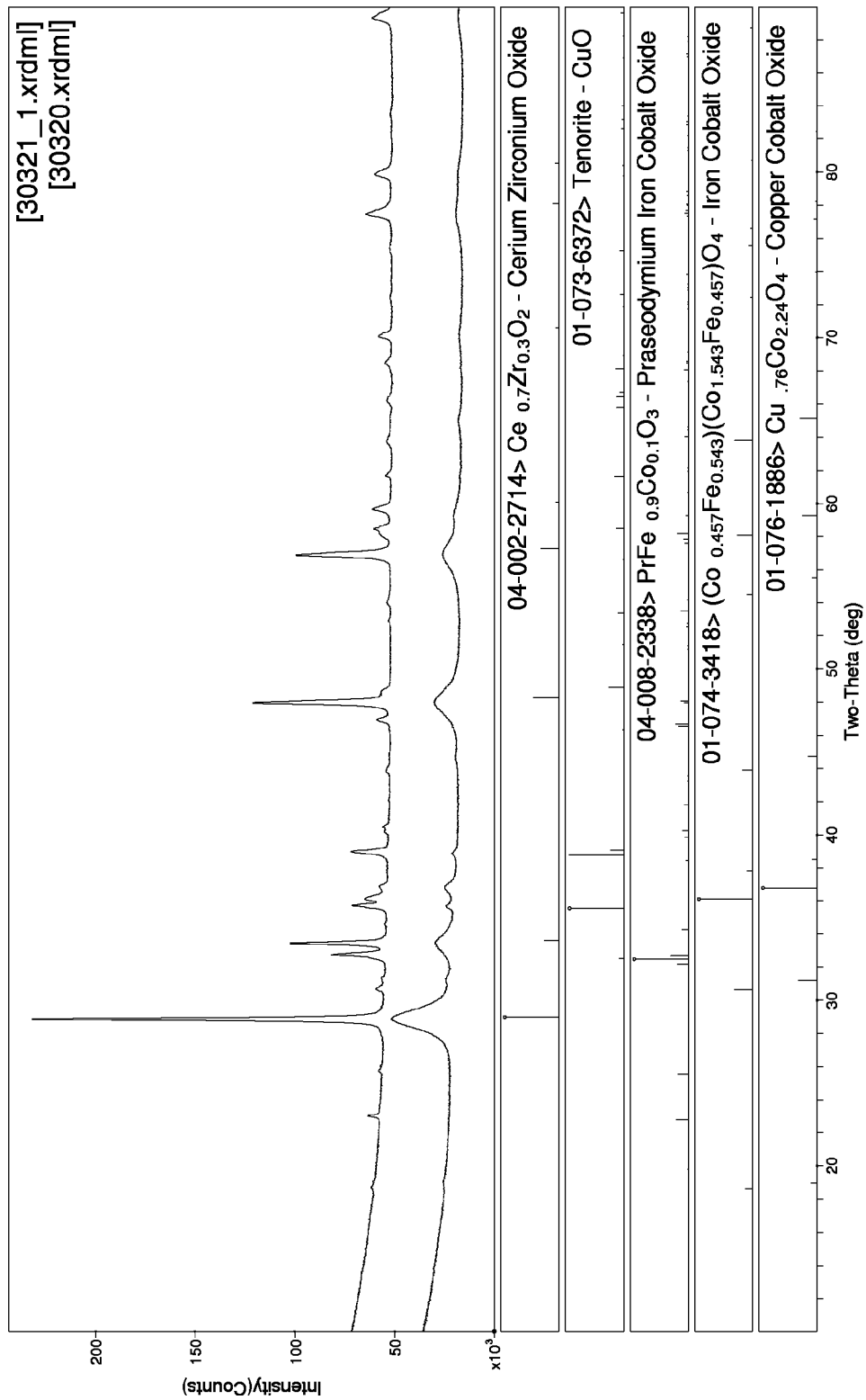
FIG. 12 is an XRD pattern showing the phase structures of the catalyst from Example 6 calcined at 500° C. and 950° C.
Figure 13:
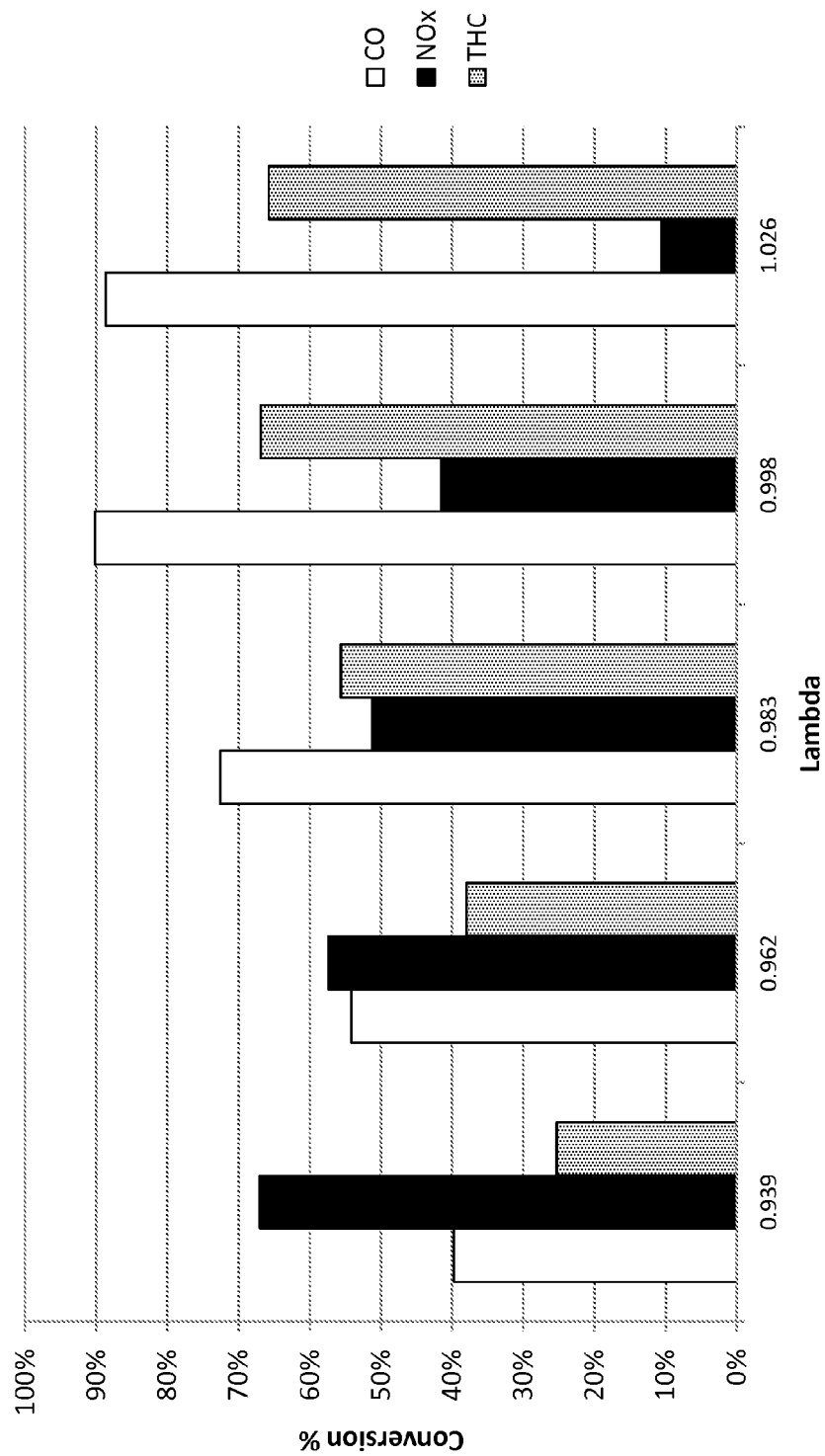
FIG. 13 shows the performance of the catalyst from Example 10 under a simulated rich-lean cycle test at 450° C.

FIG. 12 is the XRD pattern of the catalyst from Example 6, showing the phase structures. The bottom spectrum shows the catalyst calcined at 500° C., and the top spectrum shows the catalyst calcined at 950° C. As can be seen from the figure, this example catalyst incorporates mixed oxides of zicornium cerium oxide ($Ce_{0.7}Zr_{0.3}O_2$), praseodymium iron cobalt oxide ($PrFe_{0.9}CO_{0.1}O_3$), iron cobalt oxide, copper cobalt oxide and CuO.

Example 7

A pre-made support containing 50% ceria and 50% alumina was used for impregnation. This Ni-only formulation was made following the same impregnation procedure as that given in Example 1. The resulting formulation can be seen in Table 1 below.

Example 8

Sample was made with the same support as that used in Example 1 following the procedure given in Example 7 except with a different formulation. The resulting formulation can be seen in Table 1 below.

Example 9

A sample was made with a support containing 40.5% $CeO_2$, 5% $La_2O_3$, 49.6% $ZrO_2$ and 4.8% $Y_2O_3$ following the procedure given in Example 7 except with a different formulation. The resulting formulation can be seen in Table 1 below.

Example 10

12 g of Cu-Chabazite (pre-made containing 3.23 wt % CuO) and 12 g of the catalyst described in Example 9 were mixed to make a slurry. The monolith sample was prepared following the same slurry and washcoating procedures given in Example 1. The resulting formulation can be seen in Table 1 below.

Figure 14:
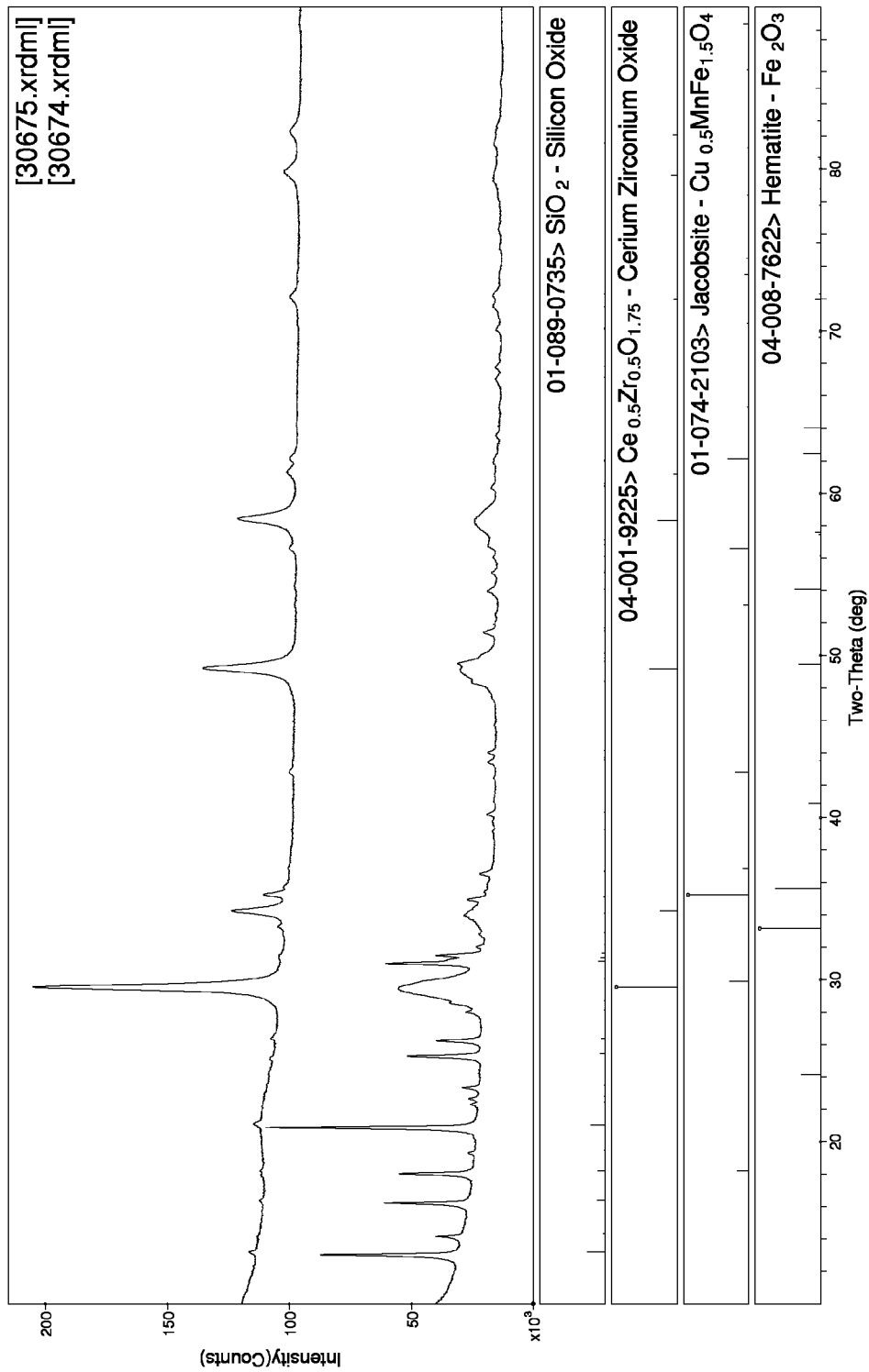
FIG. 14 is an XRD pattern showing the phase structures of the catalyst from Example 10 calcined at 500° C. and 950° C.
Figure 15:
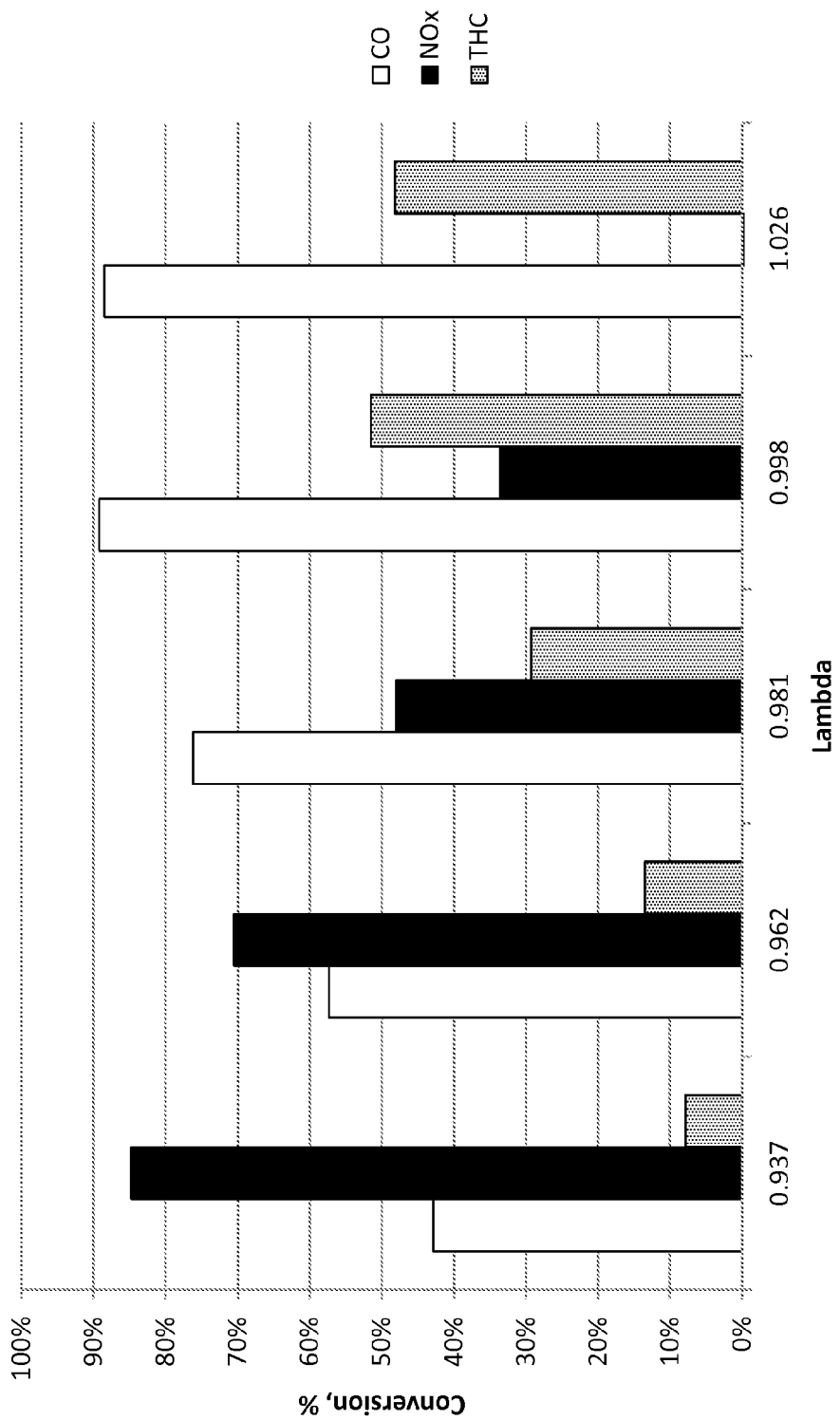
FIG. 15 shows the performance of the catalyst from Example 11 under a simulated rich-lean cycle test at 450° C.

FIG. 14 is the XRD pattern of the catalyst from Example 10, showing the phase structures. The bottom spectrum shows the catalyst calcined at 500° C., and the top spectrum shows the catalyst calcined at 950° C. This example catalyst incorporates mixed oxides of zicornium cerium oxide ($Ce_{0.5}Zr_{0.5}O_{1.75}$), jacobsite ($Cu_{0.5}MnFe_{1.5}O_4$), iron oxide ($Fe_2O_3$), and zeolite.

Example 11

The sample was made following the procedures given in Example 10, except that the catalyst made in Example 7 and that in Example 9 were used for co-milling. The resulting formulation can be seen in Table 1 below.

Figure 16:
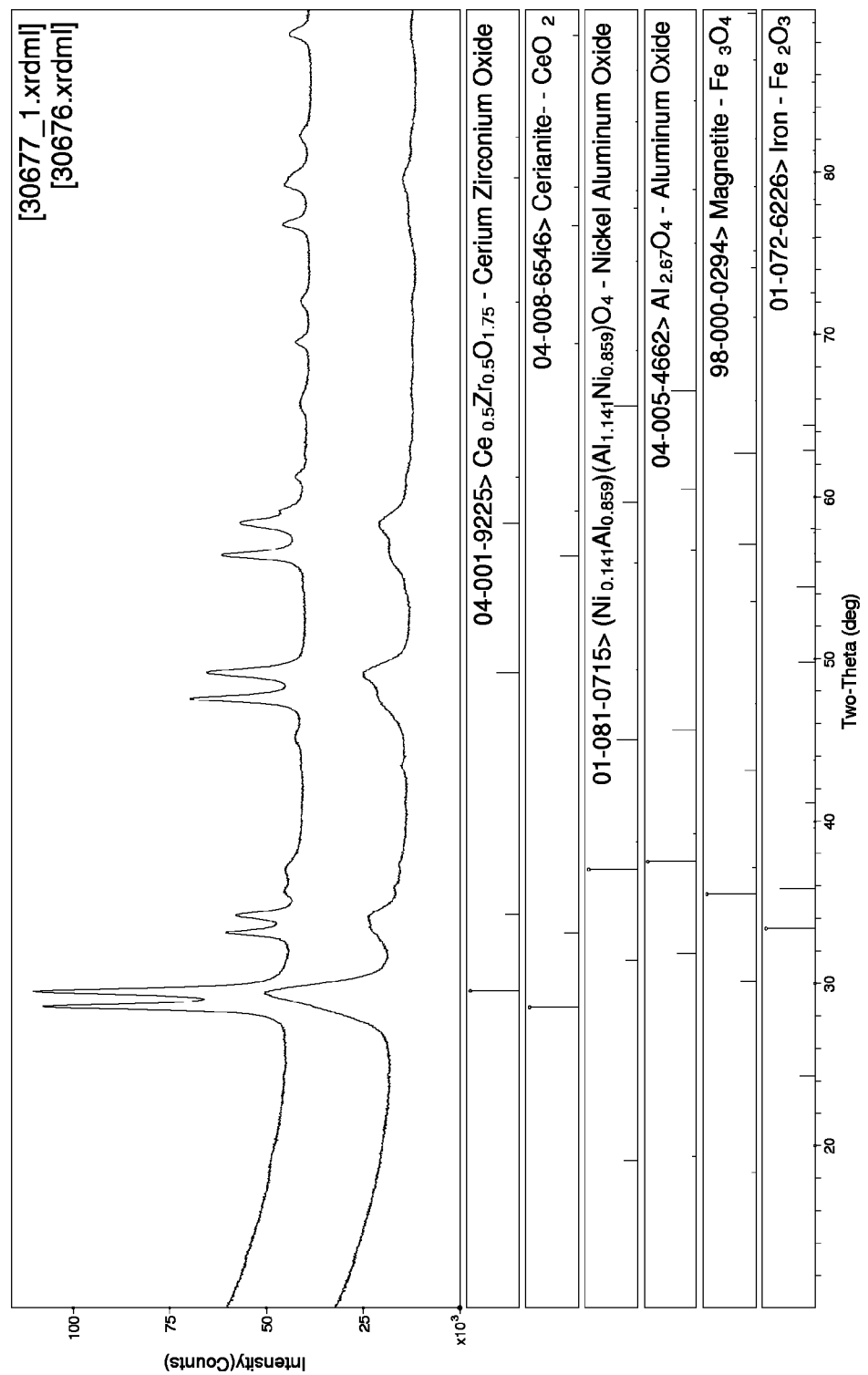
FIG. 16 is an XRD pattern showing the phase structures of the catalyst from Example 11 calcined at 500° C. and 950° C.
Figure 17:
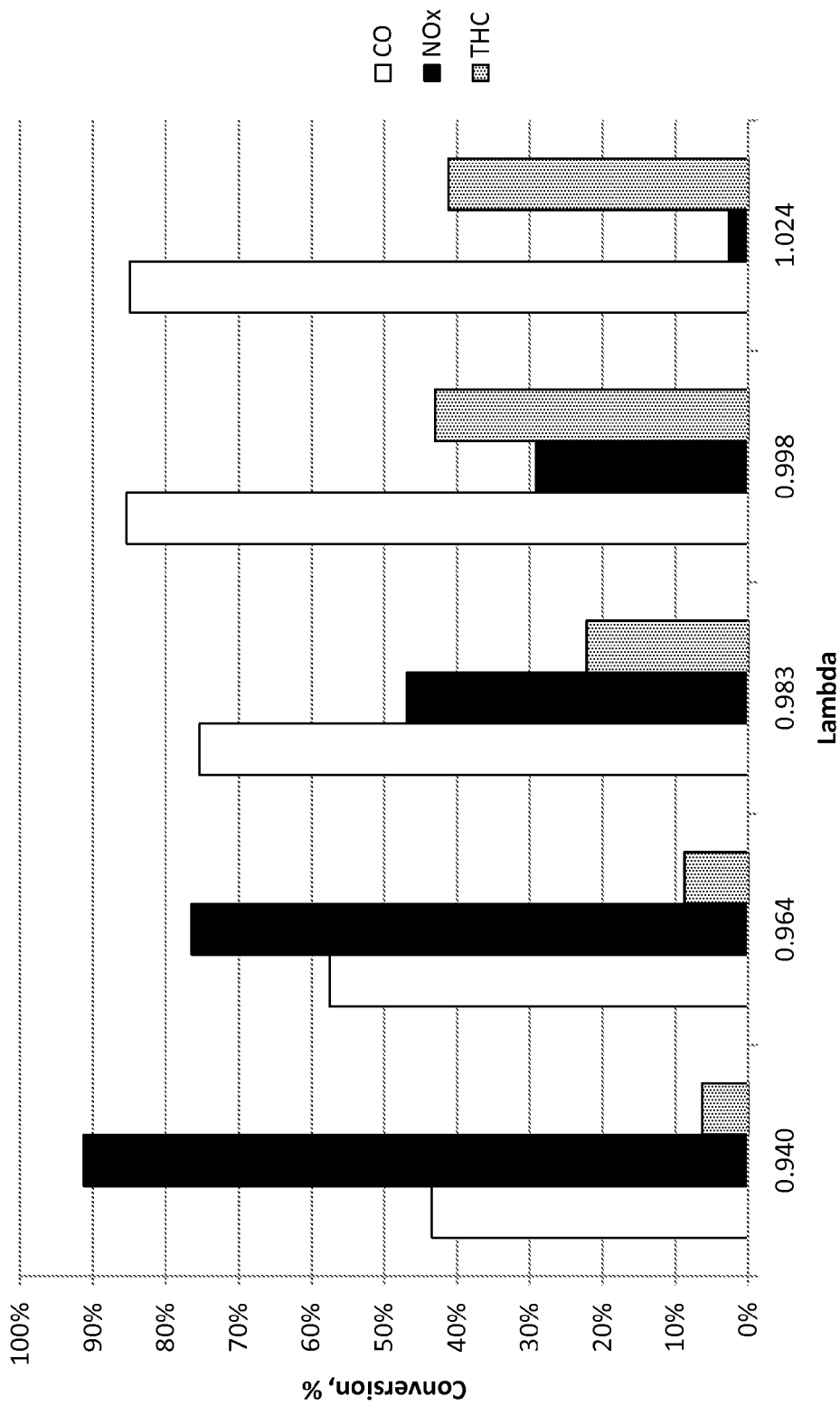
FIG. 17 shows the performance of the catalyst from Example 12 under a simulated rich-lean cycle test at 450° C.

FIG. 16 is the XRD pattern of the catalyst from Example 11, showing the phase structures. The bottom spectrum shows the catalyst calcined at 500° C., and the top spectrum shows the catalyst calcined at 950° C. This example catalyst incorporates mixed oxides of zicornium cerium oxide ($Ce_{0.5}Zr_{0.5}O_{1.75}$), cerianite ($CeO_2$), nickel aluminum oxide [$(Ni_{0.141}Al_{0.859})(Al_{1.141}Ni_{0.859})O_4$], aluminum oxide, magnetite ($Fe_3O_4$), and iron oxide ($Fe_2O_3$).

Example 12

The sample was made following the procedures given in Example 10, except that the catalyst made in Example 7 and that in Example 8 were used for co-milling. The resulting formulation can be seen in Table 1 below.

Figure 18:
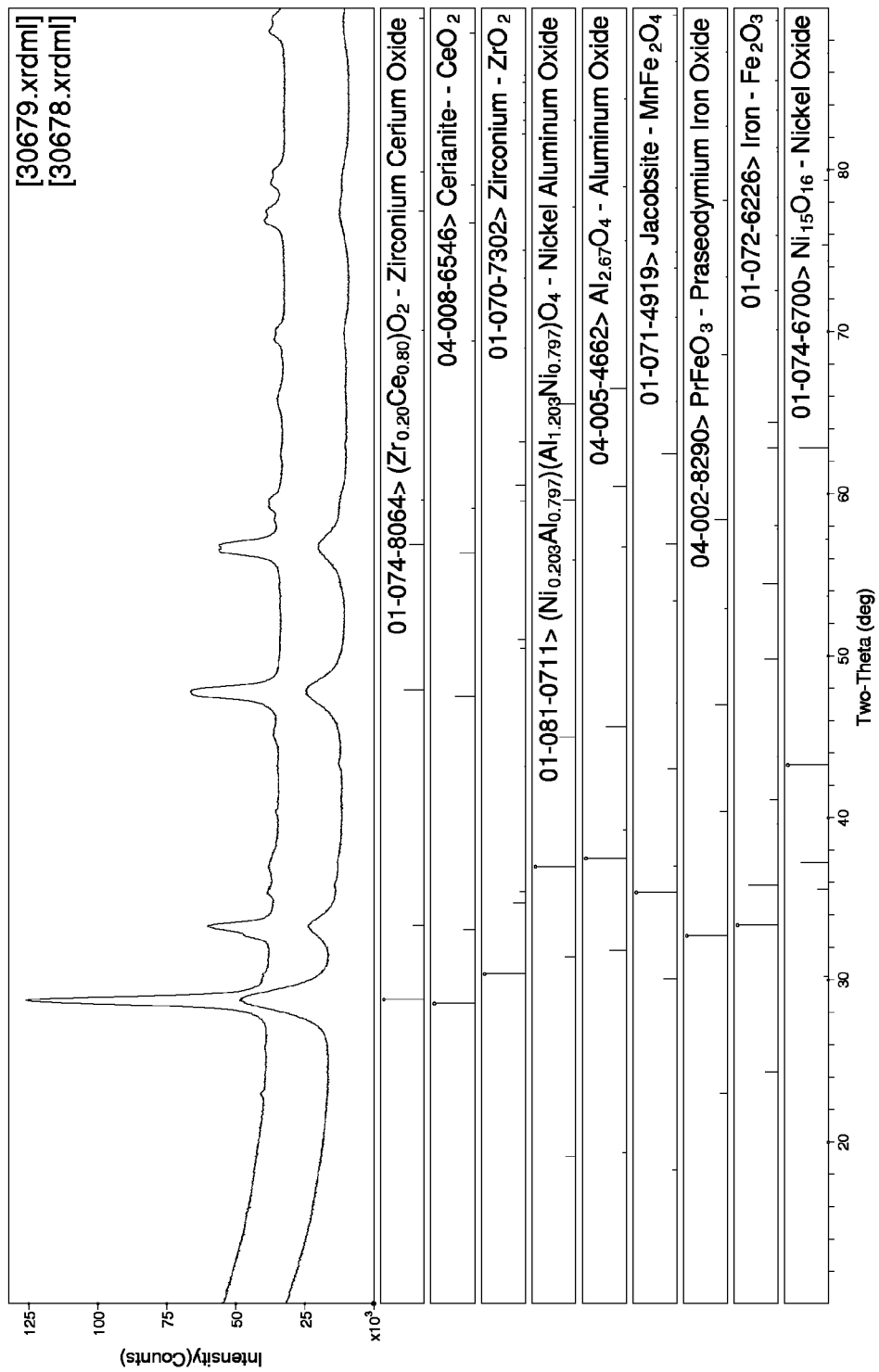
FIG. 18 is an XRD pattern showing the phase structures of the catalyst from Example 12 calcined at 500° C. and 950° C.

FIG. 18 is the XRD pattern of the catalyst from Example 12, showing the phase structures. The bottom spectrum shows the catalyst calcined at 500° C., and the top spectrum shows the catalyst calcined at 950° C. This example catalyst incorporates mixed oxides of zicornium cerium oxide ($Ce_{0.2}Zr_{0.8}O_2$), cerianite ($CeO_2$), nickel aluminum oxide [$(Ni_{0.141}Al_{0.859})(Al_{0.859})O_4$], aluminum oxide, zicornium oxide ($ZrO_2$), praseodymium iron oxide ($PrFeO_3$), iron oxide ($Fe_2O_3$), nickel oxide, jacobsite ($MnFe_2O_4$), and nickel aluminum oxide.

Example 13

Pure ceria was used as the support. The sample was made following the procedures given in Example 1, except with a different formulation. The resulting formulation can be seen in Table 1 below.

TABLE 1

Compositions of Catalysts described in Examples 1-13 (wt %)

| | CuO | $Co_2O_3$ | NiO | $Fe_2O_3$ | $MnO_2$ | $CeO_2$ | $ZrO_2$ | $Pr_2O_3$ | $Al_2O_3$ | $La_2O_3$ | $Y_2O_3$ | Chabazite |
|---|---|---|---|---|---|---|---|---|---|---|---|---|
| Ex. 1 | | 10 | | 10 | 10 | 38.5 | 10.5 | 21 | | | | |
| Ex. 2 | 15 | | | 10 | 10 | 35.75 | 9.75 | 19.5 | | | | |
| Ex. 3 | | 10 | 10 | 10 | | 38.5 | 10.5 | 21 | | | | |
| Ex. 4 | | 10 | 10 | | 10 | 38.5 | 10.5 | 21 | | | | |
| Ex. 5 | | | 10 | 10 | 10 | 38.5 | 10.5 | 21 | | | | |
| Ex. 6 | 15 | 10 | | 10 | | 35.75 | 9.75 | 19.5 | | | | |
| Ex. 7 | | | 15 | | | 42.5 | | | 42.5 | | | |
| Ex. 8 | | | | 10 | 10 | 44 | 12 | 24 | | | | |
| Ex. 9 | | | | 10 | 10 | 32.4 | 39.7 | | | 4.08 | 3.84 | |
| Ex. 10 | 1.6 | | | 5 | 5 | 16.2 | 19.8 | | | 2.04 | 1.92 | 48.4 |
| Ex. 11 | | | 7.5 | 5 | 5 | 37.45 | 19.8 | | 21.25 | 2.04 | 1.92 | |
| Ex. 12 | | | 7.5 | 5 | 5 | 43.25 | 6 | 12 | 21.25 | | | |
| Ex. 13 | | | 10 | | | 90 | | | | | | |

Performance Tests

Performance of catalysts described in the above examples were tested using a lab testing protocol to simulate rich-lean cyclic engine operation.

Lab simulating tests were conducted in fixed bed reactor under the conditions shown in Table 3. Lambda was varied by changing CO flow and keeping air flow constant.

TABLE 2

Conditions of Fixed Bed Reactor

| | |
|---|---|
| Light off | 10° C./min from 100-450° C. |
| Lambda sweeping | 450° C. |
| Gas Space velocity | 140,000 $hr^{-1}$ |

TABLE 2-continued

Conditions of Fixed Bed Reactor

| Gas composition | CO: ~0.5-5.6%<br>CO2: ~10%<br>HC (C1): ~1350 ppm ($C_3H_6/C_3H_8$ = 2)<br>NO: ~400 ppm<br>H2O: ~7% |
|---|---|

Results:

FIGS. 1, 3, 5, 7, 9, 11, 13, 15, 17 and 19 show the performance of the catalysts from Examples 1-6 and 10-12, respectively. The data show performance under the simulated rich-lean cycle test at 450° C. (Table 2). Results show the conversion percentage of CO, NOx and total hydrocarbons (THC), as lamda is varied. As can be seen from these figures, all of the prepared catalysts are effective for NOx conversion in rich conditions (e.g., when lamda is smaller), and effective for CO and hydrocarbon conversion in lean conditions (e.g., when lambda is larger).

FIG. 1 shows good CO conversion over the example 1 catalyst under both rich and lean conditions and excellent rich NOx activity and some lean Nox activity. Much improved rich hydrocarbon conversion was demonstrated in FIGS. 3, 5 and 11 with the catalysts described in Examples 2, 3 and 6. Similarly, much improved lean NOx activity was demonstrated in FIG. 13 with the example catalyst 10. High CO, hydrocarbon and NOx conversions under both rich and lean conditions can be achieved through combination and optimization of the disclosed metal oxides, space velocity and optimization of the porosity and architecture of the catalyst coating on monolith structure based on this disclosure.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A base metal catalyst composition effective to catalyze the abatement of hydrocarbons, carbon monoxide and nitrogen oxides under both rich and lean engine operating conditions comprising
a support including at least 10% by weight of reducible ceria doped with up to about 60% by weight of one or more of oxides selected from the group Al, Pr, Sm, Zr, Y, Si, Ti and La; and
a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx.

2. The catalyst composition of claim 1, wherein the kinetics of each reaction matches rich-lean cycles of engine operation dynamics.

3. The catalyst composition of claim 1, wherein the catalyst provides thermodynamically limiting oxidants during rich operation and reductants during lean operation and reaction kinetics needed for near complete conversion of HC, CO and NOx.

4. The catalyst composition of claim 1, wherein the support includes at least 35% by weight of reducible ceria.

5. The catalyst composition of claim 4, wherein the support includes up to about 99% by weight of reducible ceria.

6. The catalyst composition of claim 1, wherein the reducible ceria is doped with up to about 90% by weight of one or more oxides of Al, Pr, Sm, Zr, Y and La.

7. The catalyst composition of claim 1, wherein the base metal is selected from one or more of Ni, Mn, Co, Mo, Ga, Fe, Cu, Mg and Ba.

8. The catalyst composition of claim 7, wherein the base metal is selected from one or more of Ni, Mn, Co, Fe, and Cu.

9. The catalyst composition of claim 1, wherein the base metal oxide is present in an amount ranging from about 1 to about 30 wt %.

10. The catalyst composition of claim 1, wherein the catalyst comprises two base metals.

11. The catalyst composition of claim 1, wherein the catalyst comprises three base metals.

12. The catalyst composition of claim 1, wherein the oxide of one or more of Al, Pr, Sm, Zr, Y, Si, Ti and La is present in an amount ranging from about 1 to about 50 wt %.

13. The catalyst composition of claim 1, wherein the support comprises oxides of Zr, and Pr.

14. The catalyst composition of claim 1, wherein the support comprises oxides of Al.

15. The catalyst composition of claim 1, wherein the support comprises oxides of Zr, La and Y.

16. The catalyst composition of claim 1, wherein the support further comprises a zeolite having a chabazite crystal structure.

17. A method of treating a gas stream generated by a motorcycle, the method comprising: contacting a gas stream containing hydrocarbons, carbon monoxide and nitrogen oxides and generated by a motorcycle under both rich and lean engine operating conditions with a base metal catalyst composition comprising
a support including at least 10% by weight of reducible ceria doped with up to about 60% by weight of one or more of oxides selected from the group Al, Pr, Sm, Zr, Y, Si, Ti and La; and
a base metal oxide on the reducible ceria support, the base metal selected from one or more of Ni, Fe, Mn, Cu, Co, Ba, Mg, Ga, Ca, Sr, V, W, Bi and Mo, the base metal catalyst composition effective to promote a steam reforming reaction of hydrocarbons and a water gas shift reaction to provide $H_2$ as a reductant to abate NOx,
thereby removing at least a part of the hydrocarbons, carbon monoxide and nitrogen oxides in gas stream.

18. The method of claim 17, wherein the catalyst provides thermodynamically limiting oxidants during rich operation and reductants during lean operation and reaction kinetics needed for near complete conversion of HC, CO and NOx.

19. The method of claim 17, wherein the base metal oxide is present in an amount ranging from about 1 to about 30 wt %.

20. The method of claim 17, wherein the support includes at least 35% by weight of reducible ceria.

* * * * *